United States Patent
Lou et al.

(10) Patent No.: US 7,203,792 B2
(45) Date of Patent: Apr. 10, 2007

(54) METHOD FOR BALANCING WEAR WHEN WRITING DATA IN A FLASH MEMORY

(75) Inventors: Chang Jian Lou, Shenzhen (CN); Fang He, Shenzhen (CN)

(73) Assignees: Hong Fu Jin Precision Ind. (Shenzhen) Co., Ltd., Shenzhen (CH); Hon Hai Precision Industry Co., Ltd., Tu-Cheng (TW)

( * ) Notice: Subject to any disclaimer, the term of this patent is extended or adjusted under 35 U.S.C. 154(b) by 344 days.

(21) Appl. No.: 10/835,892

(22) Filed: Apr. 29, 2004

(65) Prior Publication Data
US 2004/0254961 A1     Dec. 16, 2004

(30) Foreign Application Priority Data
Jun. 13, 2003   (TW) ............... 92116170 A

(51) Int. Cl.
G06F 12/00     (2006.01)
(52) U.S. Cl. .................... 711/103; 711/206
(58) Field of Classification Search ......... 711/103, 711/206; 365/185.09
See application file for complete search history.

(56) References Cited

U.S. PATENT DOCUMENTS

| | | | |
|---|---|---|---|
| 5,479,638 A | * | 12/1995 | Assar et al. ............ 711/103 |
| 5,568,423 A | * | 10/1996 | Jou et al. ............ 365/185.33 |
| 5,832,493 A | | 11/1998 | Marshall et al. |
| 6,000,006 A | * | 12/1999 | Bruce et al. ............ 711/103 |
| 6,462,992 B2 | * | 10/2002 | Harari et al. .......... 365/185.33 |
| 6,591,330 B2 | | 7/2003 | Lasser |

FOREIGN PATENT DOCUMENTS

| | | |
|---|---|---|
| CN | 01119887.7 | 1/2003 |
| EP | 0722585 B1 | 7/1996 |
| EP | 001482516 A1 * | 12/2004 |
| WO | WO009710604 A1 * | 3/1997 |

* cited by examiner

*Primary Examiner*—Pierre-Michel Bataille
(74) *Attorney, Agent, or Firm*—Wei Te Chung

(57) ABSTRACT

A method for modifying file contents of a flash file stored in a flash memory while balancing wear of the flash memory includes: finding first file nodes recording the file contents to be modified; searching for a plurality of void file nodes in the flash memory, selecting void nodes as second file nodes, and sequencing the second nodes based on node versions thereof; writing modified contents of the first nodes to one or more of the second nodes in ascending order of node versions of the second nodes; building node link information of the second nodes that have been written; marking the first nodes with a predetermined flag; vacating the first nodes that have been marked with the predetermined flag, and canceling node link information of the first nodes; and updating node versions of the second nodes that have been written and the first nodes that have been vacated.

11 Claims, 2 Drawing Sheets

METHOD FOR BALANCING WEAR WHEN WRITING DATA IN A FLASH MEMORY

BACKGROUND OF THE INVENTION

1. Field of the Invention

The present invention relates to a method for writing data to a flash memory, and particularly to a method for writing data to a flash memory while balancing wear of the flash memory.

2. Background of the Invention

Currently, personal portable electronic products generally employ two means to store data: one is a random access memory (RAM), and the other is a flash memory. The RAM is relatively cheap, and has fast access rates. However, the RAM must work with a power supply in order to store data. If the power supply is shut off, data stored in the RAM is lost. At present, there are no personal portable electronic products that can provide a 24-hour power supply. Thus the RAM is not suitable for storing important data.

The flash memory is a kind of non-volatile memory (NVM). It has highly integrated components, and can protect data under conditions of no power supply. However, if the flash memory is performing an operation (such as writing or deleting) on data stored on a sector thereof while the power supply is shut off, data originally stored on the sector is prone to be lost. In addition, if the flash memory employs a File Allocation Table (FAT) file system, and the flash memory is simply updating a file allocation table or a ROOT table thereof when the power supply is shut off, all data on the flash memory is lost.

China Patent Application No. 01119887.7, published on Jan. 29, 2003, discloses a flash file management method. The invention treats each physical sector of a flash memory as a management unit that has a file head control information area, a data area, and a file status information area. Each file is made up of one or more management units. When a file is stored or modified, data on the file is stored in a void management unit. Then original management units concerned with the file are deleted, and the file allocation table in a RAM is modified accordingly.

The above-mentioned invention provides a stable flash file management method, and can minimize the risk of data loss when the power supply of the flash memory is shut off. However, the invention does not balance wear among the management units. That is, some of the physical sectors of the flash memory are used more frequently than others. The more frequently used physical sectors are prone to sustain the most wear and reach the end of their working lifetimes prematurely. This eventually leads to reduced capacity of the flash memory. Therefore, a method for balancing wear among the management units is needed to improve the useful working lifetime of the flash memory.

SUMMARY OF THE INVENTION

Accordingly, a main object of the present invention is to provide a method for modifying file contents of a flash file stored in a flash memory while balancing wear of the flash memory.

In order to accomplish the above-mentioned object, a preferred method of the present invention comprises the steps of: (i) finding first file nodes recording the file contents to be modified; (ii) searching for a plurality of void file nodes in the flash memory, selecting void file nodes as second file nodes, and sequencing the second file nodes based on node versions thereof; (iii) writing modified contents of the first file nodes to one or more of the second file nodes in ascending order of node versions of the second file nodes; (iv) building node link information of the second file nodes that have been written; (v) marking the first file nodes with a predetermined flag; (vi) vacating the first file nodes that have been marked with the predetermined flag, and canceling node link information of the first file nodes; and (vii) updating node versions of the second file nodes that have been written and the first file nodes that have been vacated.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Figure 1:
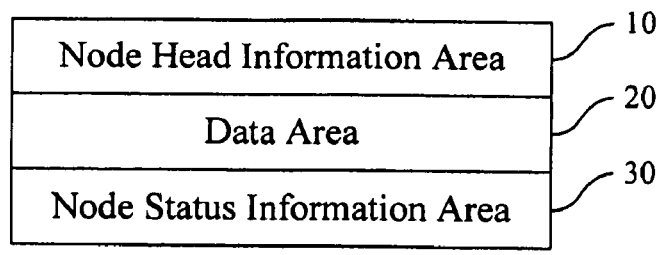
FIG. 1 is a schematic diagram of a file node employed in the preferred embodiment of the present invention, the file node comprising a node head information area and a node status information area.
Figure 2:
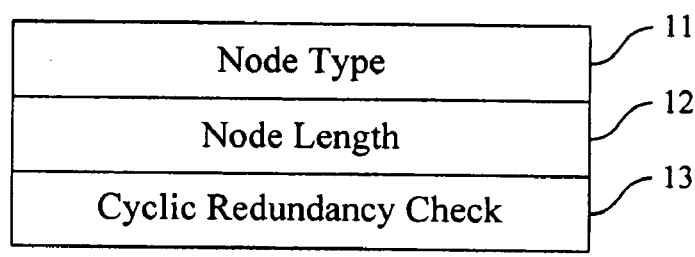
FIG. 2 is a schematic diagram of the node head information area of FIG. 1.
Figure 3:
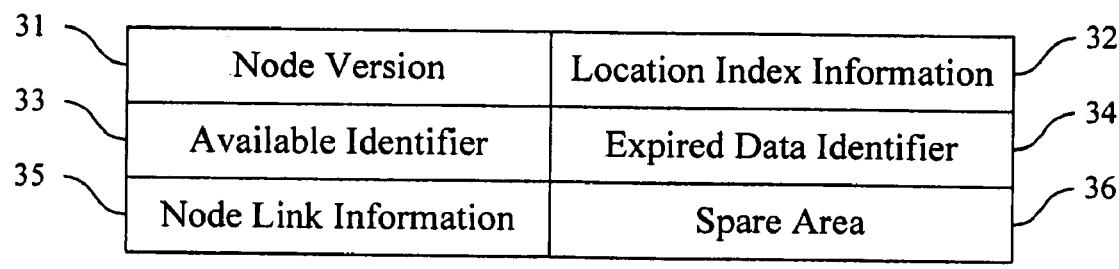
FIG. 3 is a schematic diagram of the node status information area of FIG. 1.

FIGS. 1–3 are schematic diagrams regarding a file node of a flash file in accordance with a preferred embodiment of the present invention. In the preferred embodiment, each flash file is made up of a series of file nodes. Each file node comprises a node head information area 10, a data area 20, and a node status information area 30. The node head information area 10 is provided for storing information on a node head. The information on a node head comprises a node type 11, a node length 12, and a cyclic redundancy check (CRC) 13. The data area 20 is used for storing file contents. The node status information area 30 is configured for storing information on node status. The information on node status comprises a node version 31, location index information 32, an available identifier 33, an expired data identifier 34, node link information 35, and a spare area 36.

When an operation, such as deleting or writing, is performed on a file node, a value of the node version 31 of the file node is updated. For example, the value of the node version 31 is increased by 1. Therefore, if the file node is used often, the value of the node version 31 is correspondingly high. The location index information 32 of the file node indicates a logic location of the file node in a flash memory. The available identifier 33 of the file node is provided for indicating whether the file node is available, if the file node is unavailable, the available identifier 33 is marked with a specific flag. Conversely, if the file node is available, the available identifier 33 is marked with another specific flag. When data in the file node are conveyed to another file node, the expired data identifier 34 of the file node is marked with a predetermined flag. File nodes with the predetermined flag in the expired data identifier 34 are vacated after a fixed time period, or upon the next powering on of the flash file. The node link information 35 of the file node is provided for recording information on a preceding file node and an offspring file node of the file node. Based on the node link information 35; file nodes that make up a flash file can be linked up in a logic sequence. If a file node is vacated, the node link information 35 thereof is canceled accordingly. The spare area 36 of the file node is used for storing newly-added or temporarily-stored information on the file node.

Figure 4:
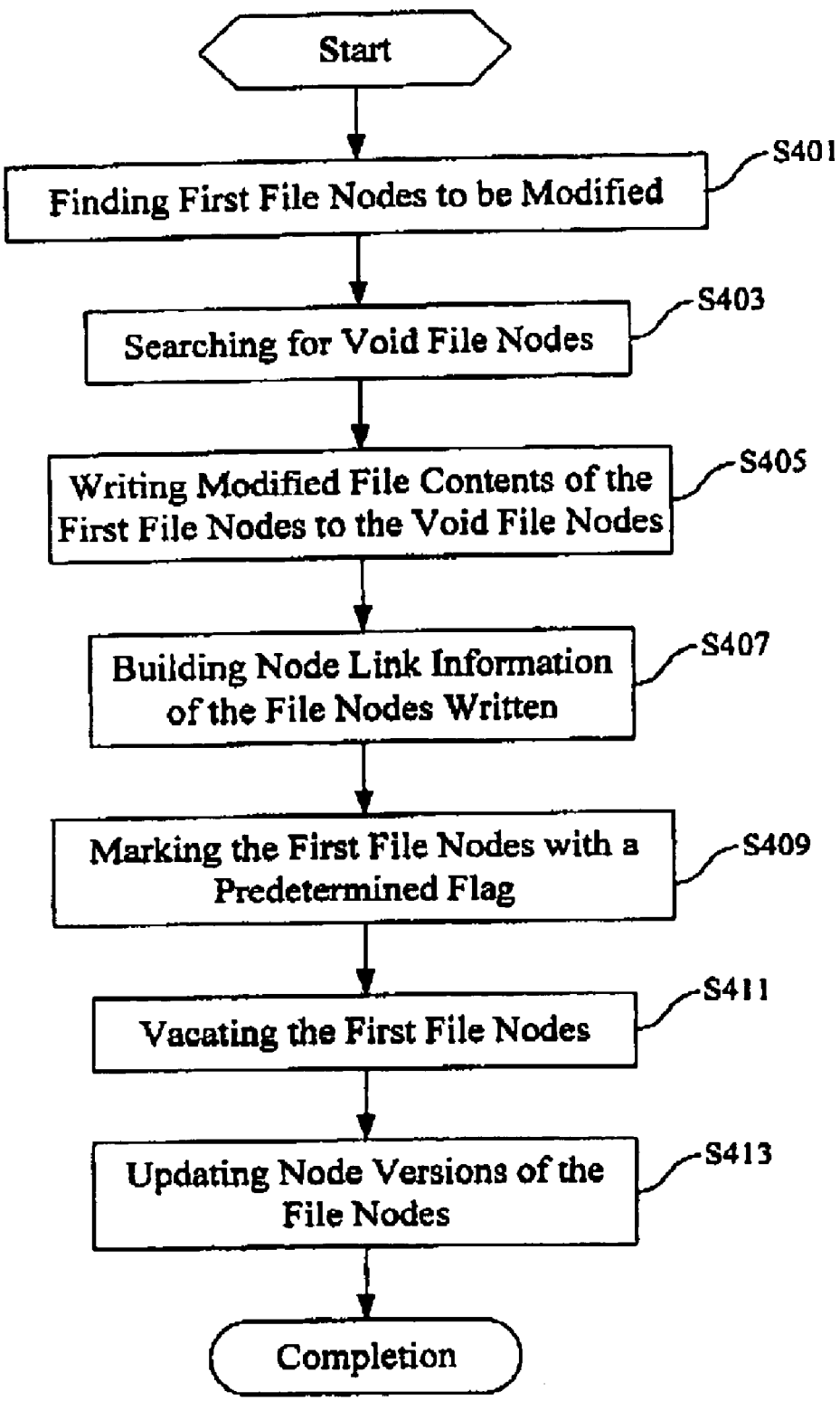
FIG. 4 is a flow chart of a preferred method for modifying file contents in a flash memory in accordance with the present invention.

FIG. 4 is a flow chart of a preferred method for modifying file contents stored in a flash memory while balancing wear of the flash memory, in accordance with a preferred embodiment of the present invention. At step S401, the flash memory finds first file nodes which record the file contents that need to be modified, based on the location index information 32 of the file nodes recording the file contents. At step S403, the flash memory searches for void file nodes having lowest version values according to the node versions 31 thereof, and sequences selected void file nodes based on the node versions 31 thereof. At step S405, the flash memory writes modified file contents of the first file nodes to one or more of the void file nodes. The void file node with the lowest node version 31 is written first, and subsequent void file nodes are written in ascending order of node version 31. At step S407, the flash memory builds the node link information 35 of the file nodes that have been written (i.e., the previously void file nodes). At step S409, the flash memory marks the expired data identifiers 34 of the first file nodes with a predetermined flag. At step S411, after a fixed time period or upon the next powering on of the flash file, the first file nodes with expired data identifiers 34 that are marked with the predetermined flag are vacated. At the same time, the link information of the first file nodes is canceled. Such first file nodes thus become new void nodes, with no link information. At step S413, the flash memory updates the node versions 31 of the file nodes that have been written and the file nodes tat have been vacated. In the preferred embodiment of the present invention, the values of the node versions 31 of both kinds of said file nodes are respectively increased by 1.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A method for modifying file contents of a flash file stored in a flash memory while balancing wear of the flash memory, the method comprising the steps of:
   finding first file nodes recording the file contents to be modified;
   searching for void file nodes in the flash memory, and selecting void file nodes as second file nodes;
   writing modified file contents of the first file nodes to at least one of the second file nodes;
   building node link information of the second file nodes that have been written; and
   updating node versions of the second file nodes that have been written.

2. The method as recited in claim 1, wherein the node link information of the second file nodes is information on a logic sequence of the second file nodes from preceding file nodes and to offspring file nodes thereof.

3. The method as recited in claim 1, further comprising the following step after the step of searching for void file nodes:
   sequencing the second file nodes based on the node versions thereof.

4. The method as recited in claim 1, wherein the writing of modified file contents of the first file nodes to at least one of the second file nodes is in ascending order of node versions of the second file nodes.

5. The method as recited in claim 1, further comprising the step of: marking the first file nodes with a predetermined flag.

6. The method as recited in claim 5, further comprising the following steps after the step of marking the first file nodes:
   vacating the first file nodes that have been marked with the predetermined flag; and
   canceling node link information of the first file nodes.

7. The method as recited in claim 6, further comprising the step of: updating node versions of the first file nodes that have been vacated.

8. The method as recited in claim 7, wherein values of the node versions of the first file nodes and the second file nodes are respectively incremented by 1.

9. The method as recited in claim 1, wherein the first file nodes recording the file contents to be modified are found based on location index information of the first file nodes.

10. A method of modifying file contents of a flash file stored in a flash memory while generally equalizing wear of the flash memory, comprising steps of:
    (a) providing a plurality of file nodes each labeled with a version number reflecting a number of modification times applied thereon;
    (b) arranging said file nodes;
    (c) writing updated data of original of said file nodes to other of said file nodes which have smaller version numbers and essentially are empty;
    (d) after a while, removing old data from said original of said file nodes to empty said original of said file nodes; and
    (e) renumbering said original of said file nodes from which said old data has been deleted, and said other of said file nodes to which said updated data has been written, by increasing corresponding version numbers.

11. The method as recited in claim 10, further including, between steps (c) and (d), a step (c1) of:
    marking said old data located in said original of said file nodes as ready-for-deletion data.

* * * * *